(12) United States Patent
Yalakanti et al.

(10) Patent No.: US 9,185,122 B2
(45) Date of Patent: Nov. 10, 2015

(54) METHODS AND SYSTEMS FOR MANAGING SECURITY IN A NETWORK

(75) Inventors: Ramachandra Yalakanti, Roseville, CA (US); Devon L. Dawson, Rocklin, CA (US); Steve Britt, Roseville, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 662 days.

(21) Appl. No.: 12/249,603

(22) Filed: Oct. 10, 2008

(65) Prior Publication Data

US 2009/0300156 A1 Dec. 3, 2009

Related U.S. Application Data

(60) Provisional application No. 61/057,837, filed on May 31, 2008.

(51) Int. Cl.
*G06F 15/173* (2006.01)
*G06F 11/00* (2006.01)
*H04L 29/06* (2006.01)
*H04L 12/24* (2006.01)

(52) U.S. Cl.
CPC ........ *H04L 63/1416* (2013.01); *H04L 41/0806* (2013.01); *H04L 63/1441* (2013.01)

(58) Field of Classification Search
CPC .................. H04L 41/0806; H04L 41/0886
USPC ................................... 709/224, 230
See application file for complete search history.

(56) References Cited

U.S. PATENT DOCUMENTS

| 2006/0075496 | A1* | 4/2006 | Carpenter et al. | 726/22 |
| 2007/0121596 | A1* | 5/2007 | Kurapati et al. | 370/356 |
| 2007/0192863 | A1* | 8/2007 | Kapoor et al. | 726/23 |

* cited by examiner

*Primary Examiner* — Hieu Hoang
(74) *Attorney, Agent, or Firm* — Hewlett-Packard Patent Department

(57) ABSTRACT

Methods, systems and computer readable mediums storing computer executable programs for managing security in a network are disclosed. A plurality of security policies associated with a plurality of network data anomalies are provided at a network management system. Each one of the plurality of security policies defines a network data anomaly specific mitigation response for each one of the plurality of network data anomalies. A first network data anomaly is detected at the network management system. A determination is made at the network management system regarding whether a first one of the plurality of security policies defines a first network data anomaly specific mitigation response to the first network data anomaly. A first mitigation command is issued from the network management system to at least one network system to implement the first network data anomaly specific mitigation response for a pre-defined period of time in accordance with the first security policy based on the determination.

19 Claims, 3 Drawing Sheets

METHODS AND SYSTEMS FOR MANAGING SECURITY IN A NETWORK

CROSS-REFERENCE TO RELATED APPLICATION

The present application claims priority from provisional application Ser. No. 61/057,837, filed May 31, 2008, the contents of which are incorporated herein by reference in their entirety.

FIELD OF THE INVENTION

The present invention generally relates to network management and more particularly to managing security in a network.

BACKGROUND OF THE INVENTION

Technological advances have led to the use of increasingly larger and complex networks with an ever increasing number of network systems as an integral part of organizational operations. Many network systems routinely receive, process and/or store data of a sensitive and/or confidential nature. Users are often provided with access to a network via external network access points to retrieve and/or exchange data with network systems within the network. The increased use of such external network access points has in many cases rendered networks increasingly vulnerable to attacks by malicious users.

Attacks on networks are growing in frequency and sophistication. The sensitive nature of data that is routinely stored in such networks often attracts malicious users or hackers that seek to gain access to the sensitive data and/or confidential data. In some cases, malicious users seek access to networks and network systems with the intention of corrupting the network and/or network systems. Examples of mechanisms that are often used by malicious users to inflict damage on a network include, but are not limited to, viruses, worms, spiders, crawlers and Trojans.

The increasing frequency of attacks on networks has often led to an increase on the demands made on network administrators to detect, assess and respond to detected network data anomalies in a timely manner.

SUMMARY OF THE INVENTION

One aspect of the invention is directed to a method of managing security in a network. A plurality of security policies associated with a plurality of network data anomalies are provided at a network management system. Each one of the plurality of security policies defines a network data anomaly specific mitigation response for each one of the plurality of network data anomalies. A first network data anomaly is detected at the network management system. A determination is made at the network management system regarding whether a first one of the plurality of security policies defines a first network data anomaly specific mitigation response to the first network data anomaly. A first mitigation command is issued from the network management system to at least one network system to implement the first network data anomaly specific mitigation response for a pre-defined period of time in accordance with the first security policy based on the determination.

Another aspect of the invention is directed to computer readable medium for storing a computer executable program for managing security in a network. Yet another aspect of the invention is directed to a system for managing security in a network.

DETAILED DESCRIPTION OF THE DRAWINGS

Figure 1:
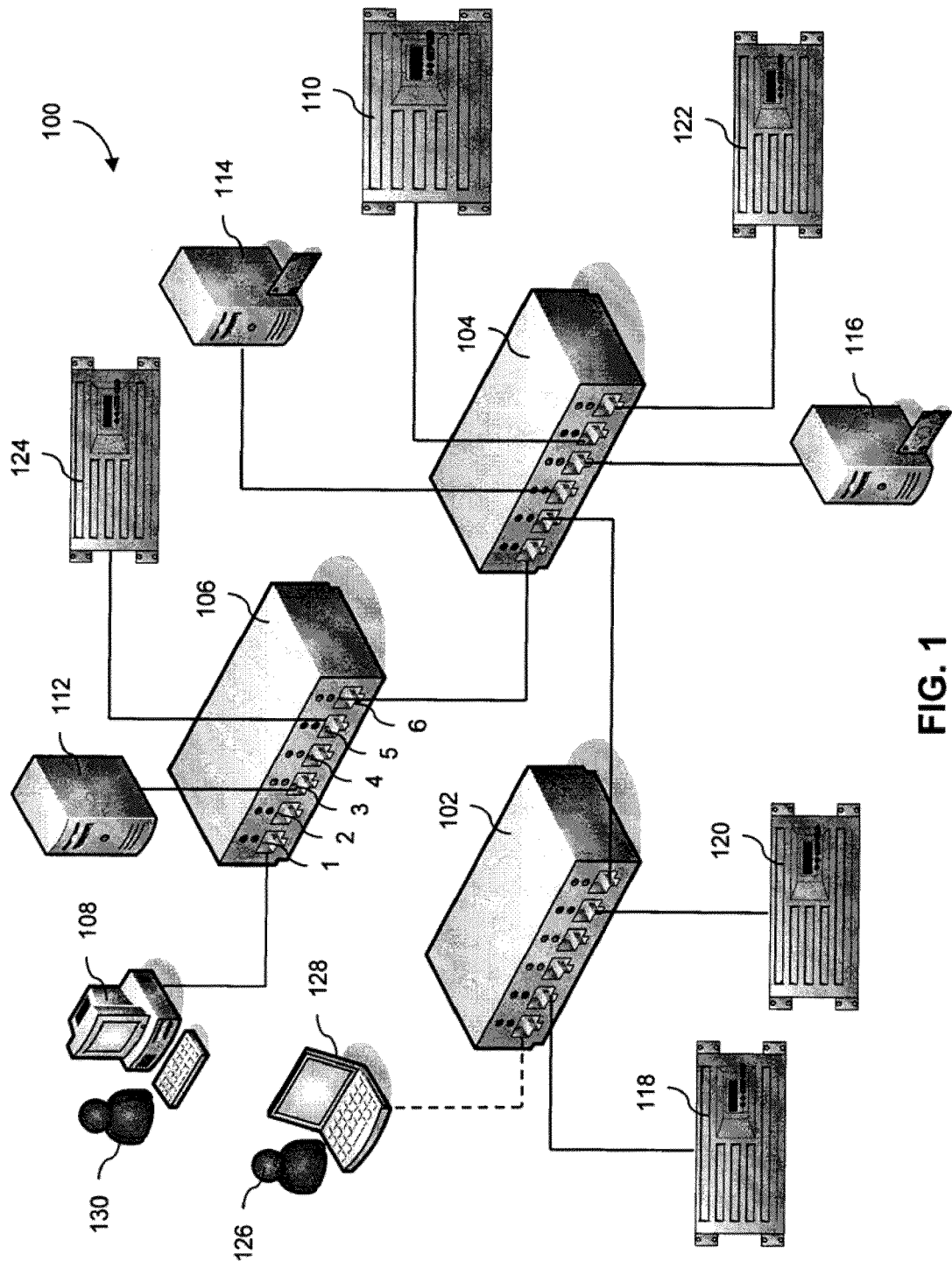
FIG. 1 is a block diagram representation of an example of a network where one embodiment of managing security in a network may be implemented.

Referring to FIG. 1, a block diagram representation of an example of a network 100 where one embodiment of managing security in a network 100 may be implemented is shown. The example network 100 generally includes first, second and third network switch systems 102, 104, 106, a network administrator system 108, a network management system 110, first, second and third server systems 112, 114, 116, and first, second, third and fourth threat assessment systems 118, 120, 122, 124. An external system 128 a laptop is communicatively coupling to the network 100.

The first, second and third network switch systems 102, 104, 106 are communicatively coupled to each other and generally communicative couple network systems to the network 100. Each of the first, second and third network switch systems 102, 104, 106 includes a plurality of data ports 1, 2, 3, 4, 5, 6. Communicative coupling is established between the first network switch system 102 and the second network switch system 104 via a communication channel between data port 6 of the first network switch system 102 and data port 2 of the second network switch system 104. Communicative coupling is established between the second network switch system 104 and the third network switch system 106 via a communication channel between data port 1 of the second network switch system 104 and data port 6 of the third network switch system 106.

In one embodiment, one or more network switch systems 102, 104, 106 includes one or more edge interconnect data ports. Data port 1 of the first network switch system 102 is communicatively coupled to the external system 128 and is an example of an edge interconnect data port. In one embodiment, one or more network switch systems are configured as edge interconnect network switch systems where the data ports 1, 2, 3, 4, 5, 6 are all configured as edge interconnect data ports.

In one embodiment, one or more network switch systems 102, 104, 106 include an embedded threat assessment system in the form of a switch based trap system. The switch based trap system is configured to detect one or more selected network data anomalies and raises a network data anomaly event upon detection of the one of the selected network data anomalies. In one embodiment, the switch based trap system issues an anomaly notification to the network management system 110 upon detection of one of the selected network data anomalies. In one embodiment, the switch based trap system issues an anomaly notification to the network administrator system 108 upon detection of one of the selected network data anomalies. In one embodiment, the switch based trap system is a virus throttling (VT) system.

In one embodiment, one or more data ports 1, 2, 3, 4, 5, 6 of one or more of the network switch systems 102, 104, 106 are configured as mirror source ports. In one embodiment, one or more data ports 1, 2, 3, 4, 5, 6 of one or more network switch systems 102, 104, 106 are configured as mirror destination ports. In one embodiment, one or more data ports 1, 2, 3, 4, 5, 6 of one or more network switch systems 102, 104, 106 are configured as local mirror source ports. In one embodiment, one or more data ports 1, 2, 3, 4, 5, 6 of one or more network switch systems 102, 104, 106 are configured as local mirror destination ports. In one embodiment, one or more data ports 1, 2, 3, 4, 5, 6 of one or more network switch systems 102, 104, 106 are configured as remote mirror source ports. In one embodiment, one or more data ports 1, 2, 3, 4, 5, 6 of one or more network switch systems 102, 104, 106 are configured as remote mirror destination ports.

While a network switch systems having six data ports have been described, network switch systems used in a network may have a fewer or a greater number of data ports. For example, many network switch systems have well over a 100 data ports. Also while a number of different types of network switch systems having the described configurations and/or features have been described, the network switch systems may be configured using alternative network switch system configurations and/or features. Furthermore while a network has been described as having three network switch systems, a fewer or greater number of network switch systems may be used.

Threat assessment systems 118, 120, 122, 124 generally monitor network data to identify network data anomalies that may pose a security threat to the network 100 and evaluate any identified network data anomalies. In one embodiment, a threat assessment system 118, 120, 122, 124 implements mitigation actions in response to the detection of a network data anomaly that may pose a potential security threat to the network 100. There are a number of different types of threat assessment systems 118, 120, 122, 124 available for use in networks 100. Examples of such threat assessment systems 118, 120, 122, 124, include but are not limited, to intrusion detection systems (IDS), intrusion prevention systems (IPS), unified threat management (UTM) systems and firewall systems (FW). In the example network 100, the first and third threat assessment systems 118, 122 are intrusion detection systems (IDS), the second threat assessment system 120 is an intrusion prevention system (IPS), and the fourth threat assessment system 124 is a unified threat management (UTM) system.

The first and second threat assessment systems 118, 120 are communicatively coupled to the network 100 via the first network switch system 102 and the third and fourth threat assessment systems 122, 124 are communicatively coupled to the network 100 via the second and third network switch systems 104, 106, respectively. More specifically, the first threat assessment system 118 is communicatively coupled to the network 100 via a communication channel between the first threat assessment system 118 and data port 2 of the first network switch system 102. The second threat assessment system 120 is communicatively coupled to the network 100 via a communication channel between the second threat assessment system 120 and data port 5 of the first network switch system 102. The third threat assessment system 122 is communicatively coupled to the network 100 via a communication channel between the third threat assessment system 122 and data port 6 of the second network switch system 104. The fourth threat assessment system 124 is communicatively coupled to the network 100 via a communication channel between the fourth threat assessment system 124 and data port 5 of the third network switch system 106.

In one embodiment, one or more threat assessment systems 118, 120, 122, 124 issues an anomaly event notification to the network administrator system 108 upon the detection of selected network data anomalies. In one embodiment, one or more threat assessment systems 118, 120, 122, 124 issues an evaluation notification to the network administrator system 108 upon completion of an evaluation of a detected network data anomaly. In one embodiment, one or more threat assessment systems 118, 120, 122, 124 issues an anomaly event notification to the network management system 110 upon the detection of a network data anomaly. In one embodiment, one or more threat assessment systems 118, 120, 122, 124 issues an evaluation notification to the network management system 110 upon completion of an evaluation of a detected network data anomaly.

While a number of different types of threat assessment systems have been described, other types of threat assessment systems may be used. Also while a network has been described as having four threat assessment systems, a fewer or greater number of threat assessment systems may be used. Furthermore, while a particular network configuration has been described for the threat assessment systems, alternative network configurations may be employed.

In one embodiment, upon the detection of selected network data anomalies by the network management system 110, the network management system 110 issues a network data anomaly assessment request to a selected threat assessment system 118, 120, 122, 124 to provide an assessment of the detected network data anomaly. In one embodiment, upon the detection of selected network data anomalies by the network management system 110, the network management system 110 issues a data mirroring command to a selected network system to mirror network data associated with the detected network data anomaly to a selected threat assessment system 118, 120, 122, 124. In one embodiment, upon the detection of selected network data anomalies by the network management system 110, the network management system 110 identifies the threat type posed by the detected network data anomaly, identifies a threat assessment system 118, 120, 122, 124 that specializes in the evaluation the identified threat type and issues a data mirroring command to a selected network system to mirror network data associated with the network data anomaly to the identified threat assessment system 118, 120, 122, 124.

The network management system 110 generally manages network operations including network security operations. In one embodiment, the network management system 110 includes a network immunity management system where the network immunity management system generally manages network security operations. In one embodiment, the network management system 110 is a network immunity management (NIM) system type of network management system that generally manages network security operations. Additional types of network management systems are used to manage other types of network operations. In one embodiment, the network management system 110 includes an embedded threat assessment system. In one embodiment, the embedded threat assessment system is a network behavior anomaly detection (NBAD) system. The network management system 110 is communicatively coupled to the network 100 via the second network switch 104. More specifically, the network management system 110 is communicatively coupled to the network 100 via a communication channel between the network management system 110 and data port 5 of the second network switch system 104. The network management system 110 will be described in greater detail with reference to FIG. 2 below.

The network administrator 130 generally manages network operations including network security operations via the network administrator system 108. The network administrator system 108 is communicatively coupled to the network 100 via the third network switch 106. More specifically, the network administrator system 108 is communicatively coupled to the network 100 via a communication channel between the network administrator system 108 and data port 1 of the third network switch system 106.

In one embodiment, the network administrator 130 is provided with the option of manually defining and/or amending security policies via the network administrator system 108. In one embodiment, anomaly notifications are received at the network administrator system 108. In one embodiment, the network administrator 130 is provided with the option of selectively manually enforcing selected security polices via the network administrator system 108. In one embodiment, the network administrator 130 is provided with the option of selectively manually implementing one or more mitigation responses to selected network data anomalies via the network administrator system 108. In one embodiment, the network administrator 130 is provided with the option of configuring selected network systems via the network administrator system 108.

In one embodiment, the network administrator 130 is provided with the option of configuring individual network switch systems 102, 104, 106 via the network administrator system 108. In one embodiment, the network administrator 130 is provided with the option of configuring individual data ports 1, 2, 3, 4, 5, 6 of individual network switch systems 102, 104, 106 via the network administrator system 108. In one embodiment, the network administrator 130 is provided with the option of configuring individual data ports 1, 2, 3, 4, 5, 6 as mirror source data ports and as mirror destination data ports via the network administrator system 108. In one embodiment, the network administrator 130 is provided with the option of configuring individual data ports 1, 2, 3, 4, 5, 6 as local mirror source data ports and as local mirror destination data ports via the network administrator system 108. In one embodiment, the network administrator 130 is provided with the option of configuring individual data ports 1, 2, 3, 4, 5, 6, as remote mirror source data ports and as remote mirror destination data ports via the network administrator system 108. While a number of different network administrations functions that may be performed by a network administrator 130 via the network administrator system 108 have been described, other network administrations functions may also be performed by a network administrator 130 via the network administrator system 108.

The first server system 112 is communicatively coupled to the network 100 via the third network switch 106 and the second and third server systems 114, 116 are communicatively coupled to the network 100 via the second network switch 104. More specifically, the first server system 112 is communicatively coupled to the network 100 via a communication channel between the first server system 112 and data port 3 of the third network switch system 106. The second server system 114 is communicatively coupled to the network 100 via a communication channel between the second server system 114 and data port 3 of the second network switch system 104. The third server system 116 is communicatively coupled to the network 100 via a communication channel between the third server system 116 and data port 4 of the second network switch system 104. In the example network 100; the first server system 112 handles data requiring a relatively low level of network security while the second and third server systems 114, 116 handle relatively sensitive financial data and require a relatively higher level of network security. While one network configuration including specific types of server systems configured within the network in a particular manner have been described, other types of server systems may be used in a network. Also while one network configuration of server systems has been described alternative network configurations may be used. Furthermore while three servers have been described as a part of the network, a fewer or greater number of servers may be used.

A user 126 has used an external system 128, a laptop, to establish communicative coupling with the network 100. The external system 128 has established communicative coupling with the network 100 via a communication channel established between the external system 128 and data port 1 of the first network switch system 102. Data port 1 is an edge interconnect data port. A user as used in the description includes human users as well as automated agents. One example of such an automated agent is a bot.

In one embodiment, communication channels established between network systems within the network 100 are wireless communication channels. In one embodiment, communication channels established between network systems within the network 100 are wired communication channel. In one embodiment, communication channels established between network systems within the network 100 are a combination of wireless communication channels and wired communication channels.

In one embodiment, communication channels established between external system 128 and the network 100 are via wireless communication channels. In one embodiment, communication channels established between external system 128 and the network 100 are via wired communication channels. In one embodiment, communication channels established between external system 128 and the network 100 are via a combination of wireless communication channels and wired communication channels.

While one particular configuration of a network 100 where one embodiment of managing security in a network 100 may be implemented has been described, embodiments of managing security in a network may be implemented in networks having alternative configurations. Furthermore, embodiments of managing security in a network may be implemented in networks including a fewer or greater number of types of network systems and including a fewer or greater number of the described network systems.

Figure 2:
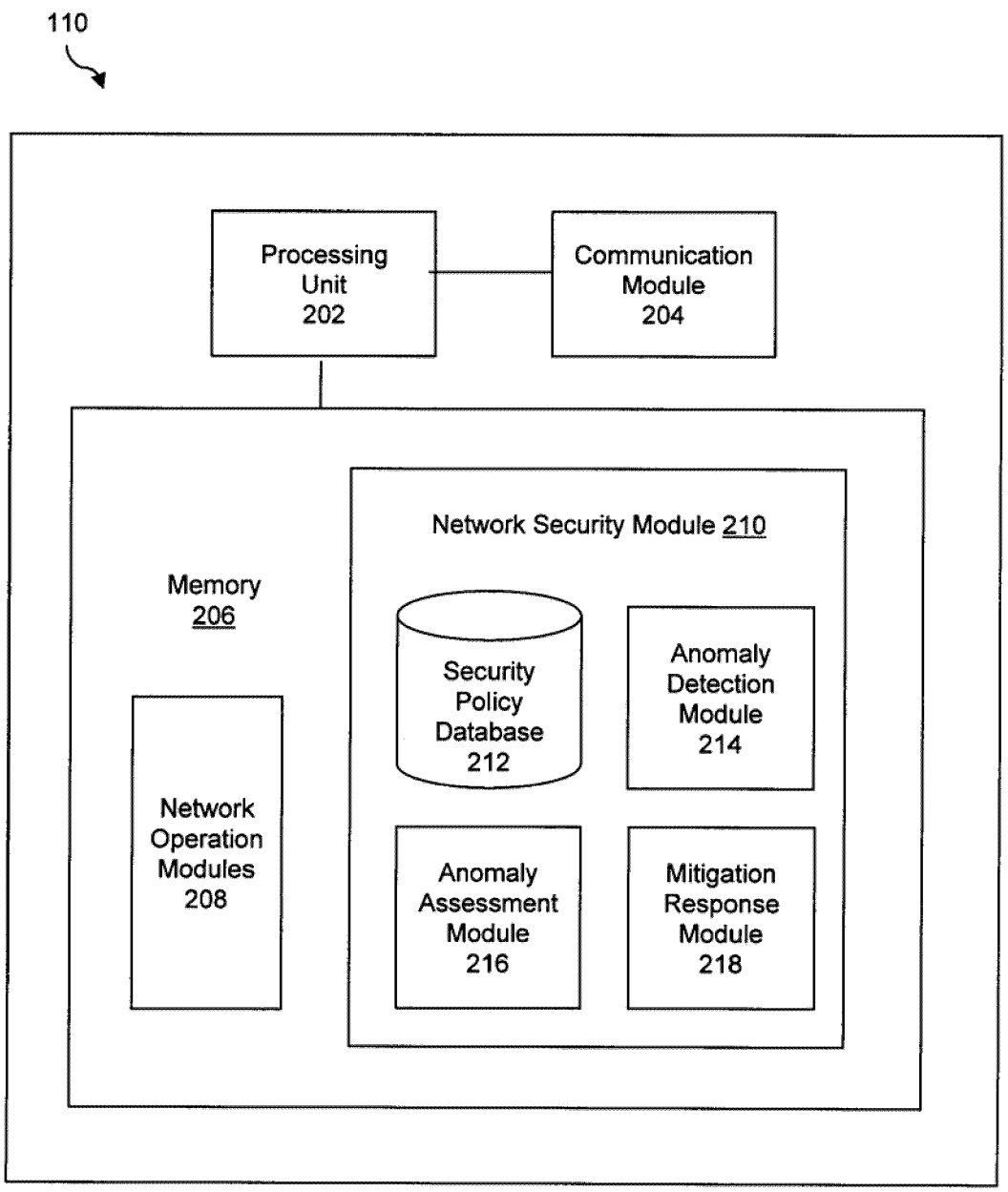
FIG. 2 is a block diagram representation of one embodiment of a network management system.

Referring to FIG. 2, a block diagram representation of one embodiment of a network management system 110 is shown. The network management system 110 generally includes a processing unit 202, a communication module 204 and a memory 206. The processing unit 202 generally includes a processor or controller. In one embodiment, the communication module 204 generally coordinates the exchange of data between the network management system 110 and other network systems. In one embodiment, the communication module 204 coordinates the exchange of data between the network management system 110 and external system 128. In one embodiment, the communication module 204 supports communication via a networking infrastructure. In one embodiment, the communication module 204 supports communication via the Internet. In one embodiment, the communication module 204 supports communication via an Intranet. In one embodiment, the communication module 204 supports wireless communication. In one embodiment, the communication module 204 supports short range wireless communication. In one embodiment, the communication module 204 supports wired communication.

In one embodiment, a network operations module 208 and a network security module 210 are stored in the memory 206. In one embodiment, a network operations module 208, a network security module 210 and network anomaly behavior detection (NBAD) module are stored in the memory 206. The NBAD system is a type of threat assessment system. The network operations module 208 generally manages network operations in the network 100. The network security module 210 generally manages network security in the network 100. More specifically, upon detection of a network data anomaly, the network security module 210 assesses the detected network data anomaly and implements a mitigation response to the detected network data anomaly based on the assessment without requiring intervention or action on the part of a network administrator 130.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

In one embodiment, the network security module 210 generally includes a security policy database 212, an anomaly detection module 214, an anomaly assessment module 216 and a mitigation response module 218. A plurality of security polices are stored in the security policy database 212. Security policies generally define mitigation responses to selected network data anomalies. Examples of network data anomalies include, but are not limited, to a network traffic anomaly and a protocol anomaly. In one embodiment, one or more of the security policies are pre-defined security polices. In one embodiment, one or more of the security polices are defined by a network administrator 130 at a network administrator system 108 and transmitted to the network management system 110 for storage in the security policy database 212.

Security policies are based on one or more different types of security parameters. In one embodiment, a security policy associated with a specific type of network data anomaly may be based on the severity of the network data anomaly. In one embodiment a security parameter is a threat type. Examples of threat types include, but are not limited to, viruses, Trojans, spiders, protocol anomalies, suspicious network data and suspicious network traffic metrics.

In one embodiment, a security parameter is a source system parameter. The source system parameter defines the source of the network data anomaly. In one embodiment, the source system parameter is defined by the media control access (MAC) address of the source system. In one embodiment the source system parameter is the specific data port that a potentially malicious user 126 has used to communicatively couple an external device 128 to the network 100. In one embodiment, the source system parameter is a user identifier, such as for example a user name used by a potentially malicious user 126 to gain access to the network 100.

In one embodiment, a security parameter is a destination system parameter. In one embodiment, a destination system parameter defines the network system that a malicious user 126 is attempting to access within the network 100. In one embodiment, the destination system parameter is the specific data port that controls the flow of network data to a destination system that a potentially malicious user 126 is attempting to access.

In one embodiment, a security parameter is a frequency of events parameter. In one embodiment an anomaly log is maintained of the detected network data anomalies at the network management system 110. In one embodiment, the frequency of a detected network data anomaly within a pre-defined period of time represents the severity of the threat that the detected network data anomaly poses to the network 100. In one embodiment, a security parameter is a number of occurrences parameter. For example, repeated attempts by a user 126 to access the network 100 or a specific network system within the network may indicate that the user 126 is a potentially malicious user. In one embodiment, a security parameter is a time period parameter. For example repeated attempts by a user 126 to access the network 100 or a network system within a pre-defined time period may indicate that the user 126 is a potentially malicious user.

In one embodiment, a security parameter is an attacker severity parameter. In one embodiment, a security parameter is a signature ID parameter. In one embodiment, the security parameter is an anomaly description parameter. In one embodiment, the security parameter is a location based parameter. In one embodiment, the security parameter is a time stamp parameter. For example, selected locations that provide access points to the network may be closed during late night hours. An attempt to access the network 100 from such a location during after hours may indicate a possible security threat to the network 100. In one embodiment, the security parameter is an action type parameter.

The anomaly detection module 214 generally manages network data anomaly detection. In one embodiment the network data anomaly is a network traffic anomaly. In one embodiment, the network data anomaly is a protocol anomaly. While a number of different types of network data anomalies have been described, the anomaly detection module may be configured to detect alternative types of network data anomalies.

In one embodiment, the anomaly detection module 214 receives an anomaly event notification from a threat assessment system that a network data anomaly has been detected. In one embodiment, the anomaly event notification includes network data anomaly related network data.

In one embodiment, the threat assessment system is a network behavior anomaly detection (NBAD) system. In one embodiment, the threat assessment system is a switch based trap system. In one embodiment, the threat assessment system is a virus throttling (VT) system. In one embodiment, the threat assessment system is an intrusion detection system (IDS). In one embodiment, the threat assessment system is an intrusion prevention system (IPS). In one embodiment, the threat assessment system is a unified threat management (UTM) system. In one embodiment, the threat assessment system is a firewall system. While a number of different types of threat assessment systems have been described, other types of threat assessment systems may also be used.

The anomaly assessment module 216 generally receives the anomaly event notification for processing. In one embodiment, the anomaly assessment module 216 assesses the severity of the network data anomaly indicated in the anomaly event notification. In one embodiment, the anomaly assessment module 216 determines whether a mitigation response is warranted depending on the assessment of the network data anomaly. In one embodiment, the anomaly assessment module 216 determines the severity of a mitigation response to a detected network data anomaly based on the assessment of the network data anomaly. In one embodiment, the anomaly assessment module 216 issues a security alert to the network administrator system 108 based on the assessment of the detected network data anomaly.

In one embodiment, the network management system 110 maintains a log of different types of network data anomaly related data associated with prior network attacks and/or attempted network attacks. Examples of network data anomaly related data include, but are not limited to, prior malicious users and/or offenders, prior victims of network attacks and/or attempted network attacks, the different network attacks, the network attack types, and the times stamps of the different network attacks. The anomaly assessment module 216 reviews the anomaly event notification in the context of network data anomaly related data stored in the log.

In one embodiment, the anomaly assessment module 216 issues a request for additional network data associated with a detected network data anomaly from selected network systems as a part of the assessment process. The anomaly assessment module 216 uses the additional network data to determine the severity of the threat posed by the network data anomaly and whether a mitigation response is warranted.

In one embodiment, the anomaly assessment module 216 issues a network data anomaly assessment request to a selected threat assessment system to provide an assessment of the detected network data anomaly. In one embodiment, the anomaly assessment module 216 selects a threat assessment system by identifying the type of threat potentially posed by the detected network data anomaly and identifying a threat assessment system that specialized in assessing the identified threat type.

In one embodiment, the anomaly assessment module 216 determines the source data port of the network data anomaly and issues a command to the source data port to operate as a mirror source data port and mirror network data received at the source data port to the selected threat assessment system to enable the selected threat assessment system to better assess the detected network anomaly. The anomaly assessment module 216 also issues a command to the destination data port, the data port that manages the flow of network traffic to the selected threat assessment system, to operate as a mirror destination data port and accept the network data mirrored by the mirror source data port.

In one embodiment, the anomaly assessment module 216 issues a network data request to a selected network system for network data associated with the detected network anomaly. In one embodiment, the anomaly assessment module 216 issues a network data request to a selected network switch system 102, 104, 106 for network data associated with the detected network anomaly. In one embodiment, the network data request is a network data polling request to a selected network system. In one embodiment, the network data request is a network data sample request to the selected network system. In one embodiment, the network data request is a network traffic metrics request from the selected network system. In one embodiment, the network data request is a request to a selected network system to monitor network data and to issue an anomaly event notification upon detection of additional network data anomalies.

If the anomaly assessment module 216 determines that a mitigation response to the detected network data anomaly is warranted, the assessment of the network data anomaly is provided to the mitigation response module 218. In one embodiment, the assessment of the network data anomaly includes an identification of the type of network data anomaly. In one embodiment, the assessment of the network data anomaly includes a classification of the type of network data anomaly. In one embodiment, the assessment of the network data anomaly includes an indication of the severity of the threat posed by the detected network data anomaly.

The mitigation response module 218 determines a mitigation response to the detected network data anomaly based on the assessment of the detected network anomaly. As mentioned previously, each of the plurality of security policies stored in the security policy database 212 defines a mitigation response to a specific network data anomaly. The mitigation response module 218 identifies a security policy from the plurality of security policies that addresses the detected network anomaly. The mitigation response module 218 implements the mitigation response detailed in the identified security policy. The mitigation response module 218 issues one or more mitigation commands to one or more selected network systems in an attempt to mitigate the threat posed by the network data anomaly to the network 100 in accordance with the identified security policy.

In one embodiment, the mitigation response module 218 issues the one or more mitigation commands to the one or more selected network systems with instructions to implement the one or more mitigation commands for a pre-defined period of time. In one embodiment, the pre-defined period of time is defined in the security policy. In one embodiment, the pre-defined period of time is defined by the severity of the threat that the detected network anomaly poses to the network 100.

In one embodiment, a mitigation command is a media access control (MAC) address lockout command where the MAC address associated with the external device 128 being used to generate the network data anomaly is denied access to the network 100. In one embodiment, a mitigation command is a MAC address filter command. The network security module 210 identifies the MAC address of the external system 128 that generated the network data anomaly and the specific data port 1 of the specific network switch system 102 that the malicious user used to access the network 100. The mitigation response module 218 issues a command to the network switch system 102 to filter out network data generated by the identified MAC address.

In one embodiment, the mitigation command is a data port shutdown command. The network security module 210 identifies the specific data port 1 of the specific network switch system 102 that the malicious user used to access the network 100 and issues a command to the network switch system 102 to shut down the identified data port 1. In one embodiment, the mitigation command is a data port rate limit command. The network security module 210 identifies the specific data port 1 of the specific network switch system 102 that the malicious user used to access the network 100 and issues a command to the network switch system 102 to limit the rate of network data flow through the identified data port 1.

In one embodiment, the mitigation command is to quarantine network data generated by a specific MAC address or a specific data port with a virtual local area network (VLAN). In one embodiment, the mitigation command is an administrator email notification command to issue a notification email to the network administrator system 108 informing the network administrator 130 about the detected network data anomaly.

In one embodiment, the mitigation command is a user identifier based lockout command. In one embodiment, the user identifier based lockout command is a username lockout command. The network security module 210 identifies the user name associated with the source of the network data anomaly and issues a command to deny network access to a user having the identified username.

As mentioned above, in one embodiment, the mitigation response defined in the identified security policy is implemented for a pre-defined period of time. In one embodiment, a re-assessment of the network data anomaly is performed after the pre-defined period of time has elapsed. A determination is made regarding whether to repeat implementation of the mitigation response again based on an analysis of the assessment.

Figure 3:
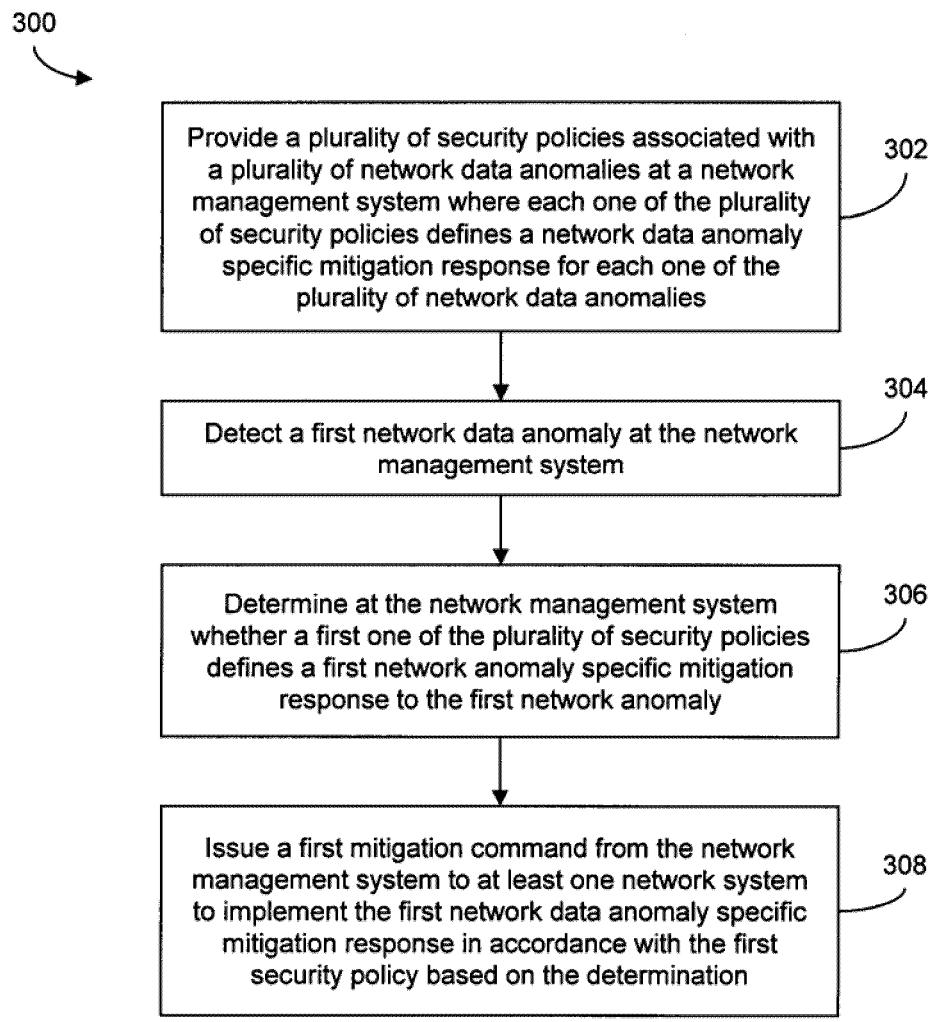
FIG. 3 is a flowchart representation of one embodiment of a method of managing security in a network.

Referring to FIG. 3 a flowchart representation of one embodiment of a method 300 of managing security in a network 300 is shown. A plurality of security policies associated with a plurality of network data anomalies are provided at a network management system 110 at step 302. Each one of the plurality of security policies defines a network data anomaly specific mitigation response for each one of the plurality of network data anomalies. A first network data anomaly is detected at the network management system 110 at step 304. A determination is made at the network management system 110 regarding whether a first one of the plurality of security policies defines a first network data anomaly specific mitigation response to the first network data anomaly at step 306. A first mitigation command is issued from the network management system 100 to at least one network system to implement the first network data anomaly specific mitigation response for a pre-defined period of time in accordance with the first security policy based on the determination at step 308.

While the steps in the method 300 have been described in a particular order, the steps may be performed in a different order. Additional steps may be performed in addition to the described steps.

In one embodiment, a computer readable medium stores a computer executable program for managing security in a network. The computer readable medium includes compute readable code for providing a plurality of security policies associated with a plurality of network data anomalies at a network management system, each one of the plurality of security policies defining a network data anomaly specific mitigation response for each one of the plurality of network data anomalies, compute readable code for detecting a first network data anomaly at the network management system, compute readable code for determining at the network management system whether a first one of the plurality of security policies defines a first network data anomaly specific mitigation response to the first network data anomaly, and compute readable code for issuing a first mitigation command from the network management system to at least one network system to implement the first network data anomaly specific mitigation response for a pre-defined period of time in accordance with the first security policy based on the determination.

In one embodiment, a system manages security in a network. The system includes a security policy database 212, an anomaly detection module 214 and a mitigation response module 218. The security policy database 212 stores a plurality of security policies associated with a plurality of network data anomalies at a network management system 110, each one of the plurality of security policies defining a network data anomaly specific mitigation response for each one of the plurality of network data anomalies. The anomaly detection module 214 detects a first network data anomaly at the network management system 110. The mitigation response module 218 determines at the network management system 110 whether a first one of the plurality of security policies defines a first network data anomaly specific mitigation response to the first network data anomaly and issues a first mitigation command from the network management system 110 to at least one network system to implement the first network data anomaly specific mitigation response for a pre-defined period of time in accordance with the first security policy based on the determination.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of managing security in a network, the method comprising:

providing a plurality of security policies associated with a plurality of network data anomalies at a network management system, each one of the plurality of security policies defining a network data anomaly specific mitigation response for each one of the plurality of network data anomalies;

detecting a first network data anomaly at the network management system;

selecting a threat assessment system to assess the first network data anomaly;

issuing, by the network management system, a command to a source data port where the first network data anomaly was detected to mirror network data received at the source data port to the selected threat assessment system;

receiving, from the selected threat assessment system, a confirmation of the first network data anomaly;

determining at the network management system whether a first one of the plurality of security policies defines a first network data anomaly specific mitigation response to the first network data anomaly; and issuing a first mitigation command from the network management system to at least one network system to implement the first network data anomaly specific mitigation response for a pre-defined period of time in accordance with the first security policy based on the determination.

2. The method of claim 1, wherein providing a plurality of security policies at a network management system comprises:

defining a security policy at the network administrator system; and providing the defined security policy to the network management system.

3. The method of claim 1, wherein detecting a first network data anomaly at the network management system comprises detecting a network data anomaly selected from a group consisting of a network traffic anomaly and a protocol anomaly.

4. The method of claim 1, further comprising:

determining whether to implement the first network data anomaly specific mitigation response based on the confirmation of the first network data anomaly.

5. The method of claim 1, further comprising:

issuing a network data request from the network management system to a selected network system for network data associated with the detected first network data anomaly, the network data request being selected from a group consisting of a network data polling request, a network data sampling request, a network traffic metrics request and an anomaly notification request;

assessing network data received in response to the network data request to evaluate the detected first network data anomaly; and determining whether to implement the first network data anomaly specific mitigation response based on the assessment.

6. The method of claim 1, wherein detecting a first network data anomaly at the network management system comprises receiving an anomaly event notification from a network system selected from a group consisting of a network trap system, network behavior anomaly detection (NBAO) system, switch based trap system, a virus throttling (VT) system, an intrusion detection system (IDS), an intrusion prevention system (IPS), a unified threat management (UTM) system and a firewall system.

7. The method of claim 1, wherein issuing a first mitigation command from the network management system to at least one network system to implement the first mitigation response comprises issuing a mitigation command selected from a group consisting of a media access control (MAC) lockout command, a MAC address filter command, a data port shutdown command, a virtual local area network (VLAN) quarantine command, a data port rate limit command, an administrator email notification command, a user identifier based lockout command and a username lockout command.

8. The method of claim 1, wherein providing a plurality of security policies at a network management system comprises providing a first security policy based on a security parameter selected from a group consisting of a threat type parameter, a source system parameter, a destination system parameter, a frequency of events parameter, a number of occurrences parameter, a time period parameter, an attacker severity parameter, a signature identification parameter, an anomaly description parameter, a location based parameter, a time stamp parameter and an action type parameter.

9. The method of claim 1, further comprising:

performing an assessment of the network data anomaly after the pre-defined period of time has elapsed;

determining whether to issue a second mitigation command to repeat implementation of the first mitigation response based on an analysis of the assessment; and issuing a second mitigation command to repeat implementation of the first network anomaly specific mitigation response based on the determination.

10. A non-transitory computer readable medium for storing a computer readable code that when executed by a processor cause the processor to:

provide a plurality of security policies associated with a plurality of network data anomalies at a network management system, each one of the plurality of security policies defining a network data anomaly specific mitigation response for each one of the plurality of network data anomalies;

detect a first network data anomaly at the network management system;

select a threat assessment system to assess the first network data anomaly;

issue a command to a source data port where the first network data anomaly was detected to mirror network data received at the source data port to the selected threat assessment system;

receive, from the selected threat assessment system, a confirmation of the first network data anomaly;

determine at the network management system whether a first one of the plurality of security policies defines a first network data anomaly specific mitigation response to the first network data anomaly; and issue a first mitigation command from the network management system to at least one network system to implement the first network data anomaly specific mitigation response for a pre-defined period of time in accordance with the first security policy based on the determination.

11. The non-transitory computer readable medium of claim 10, wherein the computer readable code that causes the processor to provide a plurality of security policies at a network management system comprises computer readable code to cause the processor to:

define a security policy at the network administrator system; and provide the defined security policy to the network management system.

12. The non-transitory computer readable medium of claim 10, wherein to detect the first network data anomaly at the network management system, the computer readable code causes the processor to detect a network data anomaly selected from a group consisting of a network traffic anomaly and a protocol anomaly.

13. The non-transitory computer readable medium of claim 10, wherein the computer readable code further causes the processor to:
   determine whether to implement the first network data anomaly specific mitigation response based on the confirmation of the first network data anomaly.

14. The non-transitory computer readable medium of claim 10, wherein the computer readable code further causes the processor to:
   issue a network data request from the network management system to a selected network system for network data associated with the detected first network data anomaly, the network data request being selected from a group consisting of a network data polling request, a network data sampling request, a network traffic metrics request and an anomaly notification request;
   assess network data received in response to the network data request to evaluate the detected first network data anomaly, and
   determine whether to implement the first network data anomaly specific mitigation response based on the assessment.

15. The non-transitory computer readable medium of claim 10, wherein to detect the first network data anomaly at the network management system, the computer readable code causes the processor to receive an anomaly event notification from a network system selected from a group consisting of a network trap system, network behavior anomaly detection (NBAD) system, switch based trap system, a virus throttling (VT) system, an intrusion detection system (IDS), an intrusion prevention system (IPS), a unified threat management (UTM) system and a firewall system.

16. The non-transitory computer readable medium of claim 10, wherein to issue the first mitigation command from the network management system to a least one network system to implement the first mitigation response, the computer readable code causes the processor to issue a mitigation command selected from a group consisting of a media access control (MAC) lockout command, a MAC address filter command, a data port shutdown command, a virtual local area network (VLAN) quarantine command, a data port rate limit command, an administrator email notification command, a user identifier based lockout command and a username lockout command.

17. The non-transitory computer readable medium of claim 10, wherein to provide the plurality of security policies at a network management system, the computer readable code causes the processor to provide a first security policy based on a security parameter selected from a group consisting of a threat type parameter, a source system parameter, a destination system parameter, a frequency of events parameter, a number of occurrences parameter, a time period parameter, an attacker severity parameter, a signature identification parameter, an anomaly description parameter, a location based parameter, a time stamp parameter and an action type parameter.

18. The non-transitory computer readable medium of claim 10, wherein the computer readable code further cause the processor to:
   perform an assessment of the network data anomaly after the pre-defined period of time has elapsed;
   determine whether to issue a second mitigation command to repeat implementation of the first mitigation response based on an analysis of the assessment; and
   issue a second mitigation command to repeat implementation of the first network anomaly specific mitigation response based on the determination.

19. A system for managing security in a network comprising:
   a processor;
   a memory; and
   a security policy database, stored in the memory, to store a plurality of security policies associated with a plurality of network data anomalies at a network management system, each one of the plurality of security policies defining a network data anomaly specific mitigation response for each one of the plurality of network data anomalies,
   wherein the memory stores instructions that when executed by the processor cause the processor to:
      detect a first network data anomaly at the network management system;
      select a threat assessment system to assess the first network data anomaly;
      issue a command to a source data port where the first network data anomaly was detected to mirror network data received at the source data port to the selected threat assessment system;
      receive, from the selected threat assessment system, a confirmation of the first network data anomaly;
      determine at the network management system whether a first one of the plurality of security policies defines a first network data anomaly specific mitigation response to the first network data anomaly; and
      issue a first mitigation command from the network management system to at least one network system to implement the first network data anomaly specific mitigation response for a pre-defined period of time in accordance with the first security policy based on the determination.

* * * * *